United States Patent [19]
Upton

[11] Patent Number: 5,315,564
[45] Date of Patent: May 24, 1994

[54] SENSING APPARATUS

[75] Inventor: Charles F. Upton, Juarez, Mexico

[73] Assignee: FMC Corporation, Chicago, Ill.

[21] Appl. No.: 832,146

[22] Filed: Feb. 6, 1992

[51] Int. Cl.$^5$ .................................. H04R 17/00
[52] U.S. Cl. ............................. 367/140; 367/135; 367/137; 310/314; 310/317; 47/1.7; 239/77
[58] Field of Search .............. 367/140, 903, 901, 137, 367/135; 310/314, 317; 47/1.7; 239/146, 150, 722, 743, 73, 77

[56] References Cited

U.S. PATENT DOCUMENTS

| | | | |
|---|---|---|---|
| 4,440,482 | 4/1984 | Shenk | 354/195.1 |
| 4,768,713 | 9/1988 | Roper | 239/77 |
| 4,823,268 | 4/1989 | Giles et al. | 364/424.07 |
| 4,957,100 | 9/1990 | Herzog et al. | 128/24 A |
| 4,989,783 | 2/1991 | Douglas | 239/77 |
| 4,991,341 | 2/1991 | Douglas | 239/77 |
| 5,063,541 | 11/1991 | Kondo et al. | 367/7 |
| 5,134,961 | 8/1992 | Giles | 118/684 |
| 5,138,217 | 8/1992 | Wada et al. | 310/316 |
| 5,144,592 | 9/1992 | Bonis | 367/87 |
| 5,168,471 | 12/1992 | Parra | 367/99 |

FOREIGN PATENT DOCUMENTS

| | | |
|---|---|---|
| 3621819 | 2/1988 | Fed. Rep. of Germany . |
| 2625869 | 7/1989 | France . |
| 2626081 | 7/1989 | France . |

OTHER PUBLICATIONS

C. Biber et al, "The Polaroid Ultrasonic Ranging System", 67th Convention Audio Engineering Society in New York, Oct. 31, 1980.
Polaroid Corp., "Ultrasonic Ranging System", undated.
Polaroid Corp., "Polaroid Ultrasonic Ranging System Handbook Application Notes/Technical Papers", undated.

Primary Examiner—J. Woodrow Eldred
Attorney, Agent, or Firm—Michael Lee; R. C. Kamp; R. B. Megley

[57] ABSTRACT

The invention provides a controlling device which comprises a control box, a power box, a right sensor control unit attached to a plurality of proximity detectors, a left sensor control unit attached to a plurality of proximity detectors, and a valve box control unit, wherein each proximity detector comprises an ultrasonic transducer, a first circuit for handshaking, noise reduction and voltage regulation, and a second and third circuit for digital signal generation, analog reception and digital conversion, wherein the first circuit is connected between a left or right sensor control and second and third circuits of a proximity detector.

16 Claims, 7 Drawing Sheets

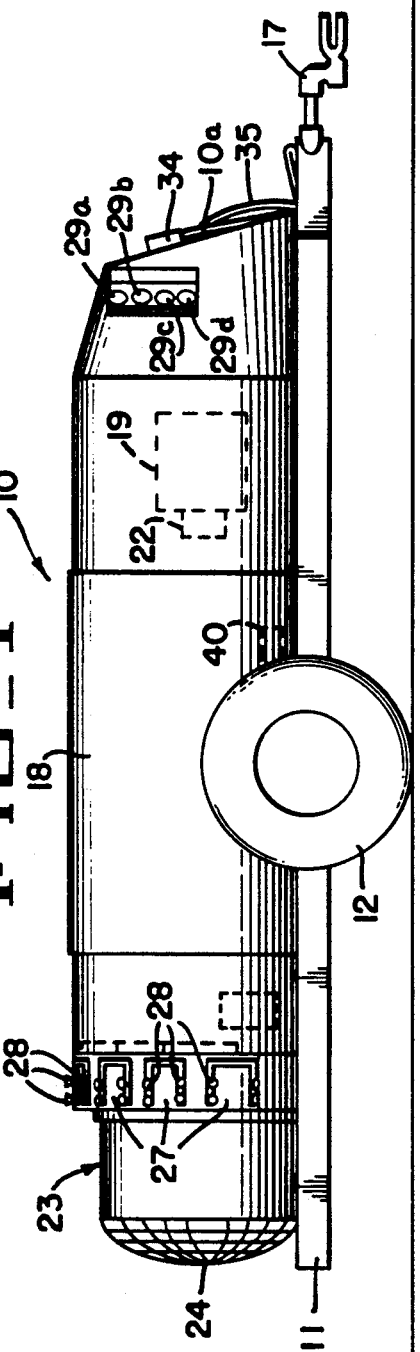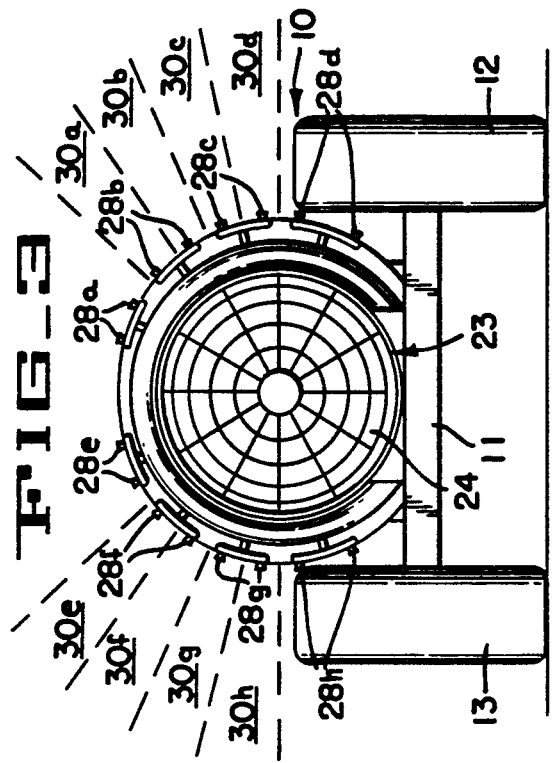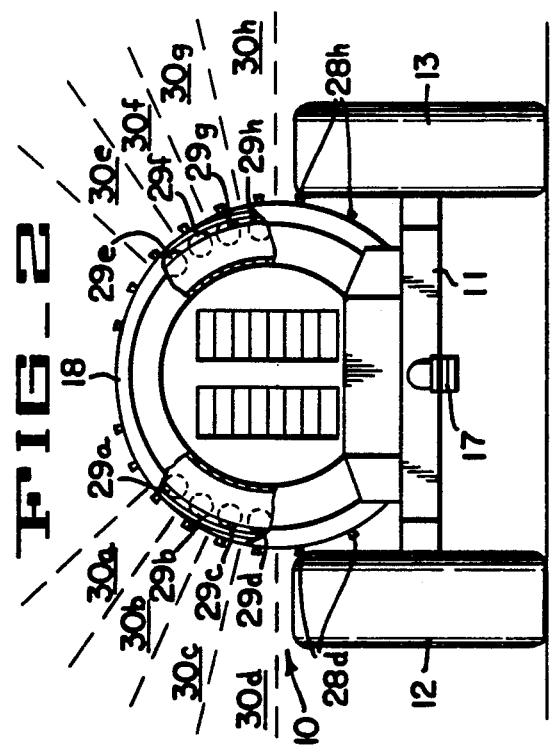

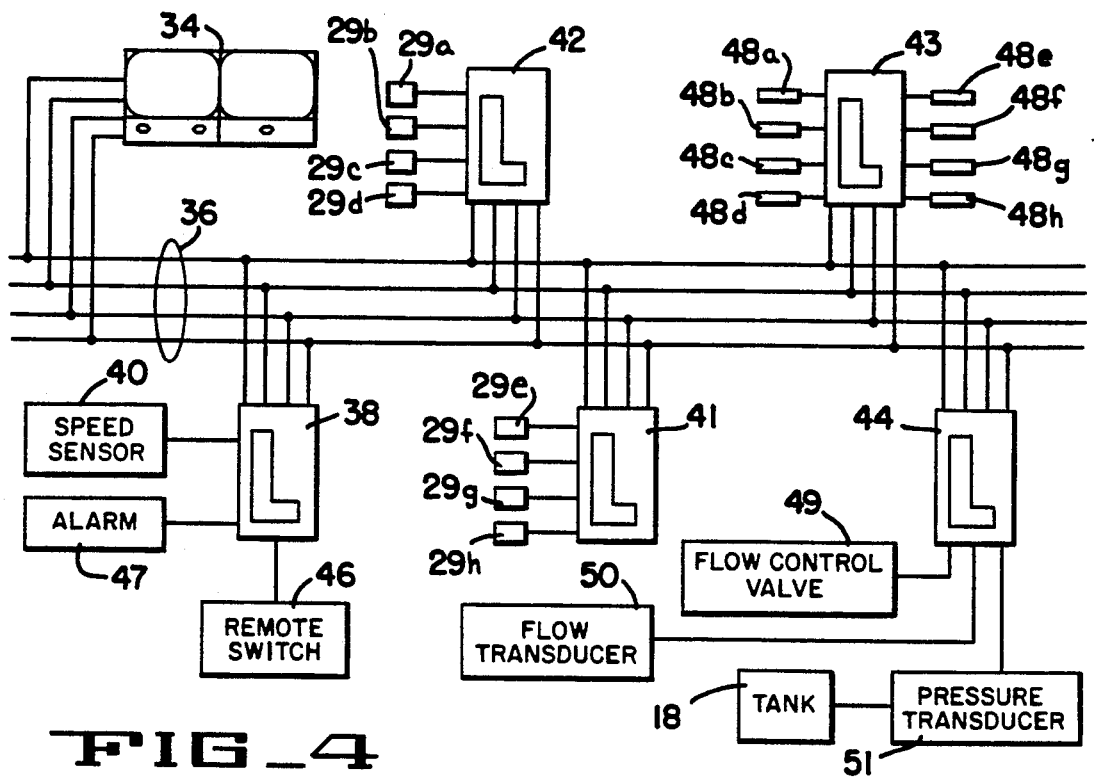
FIG_4
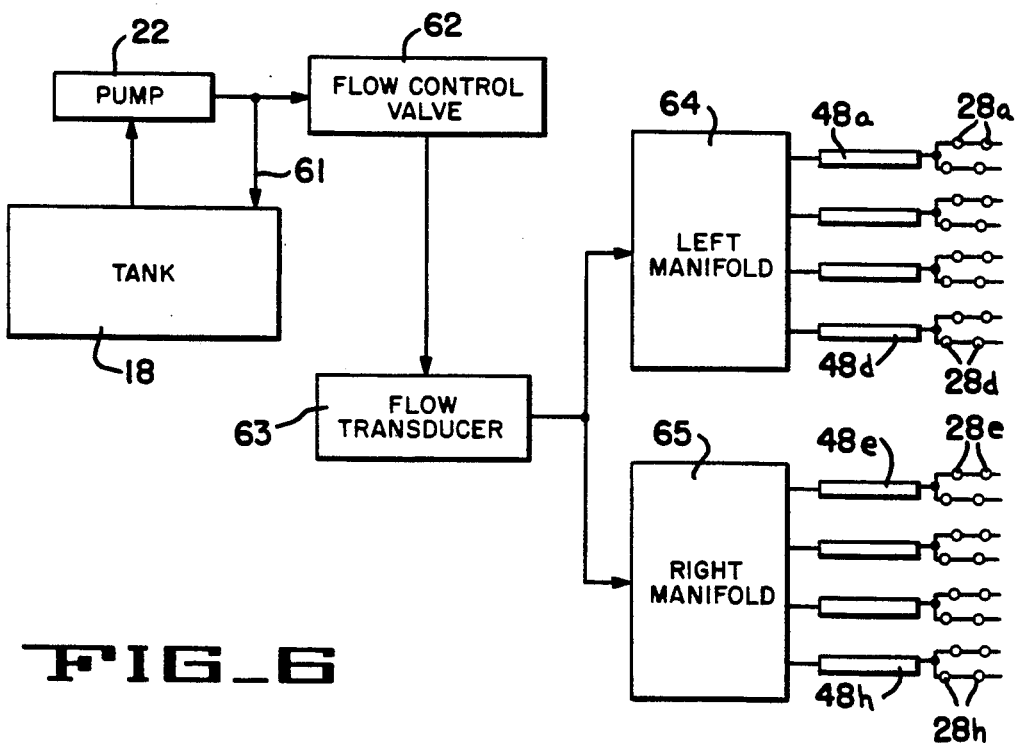
FIG_6

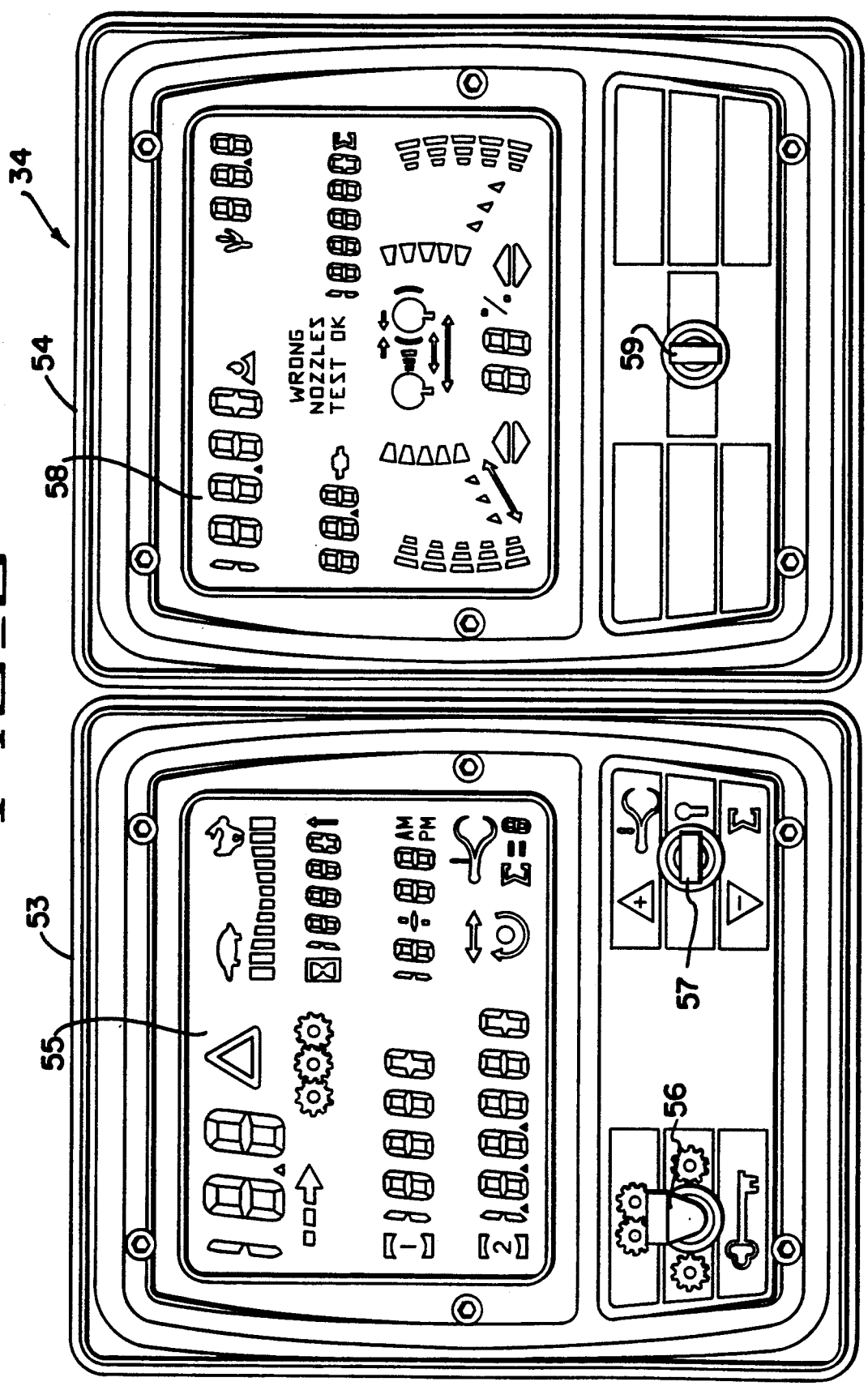
FIG_5

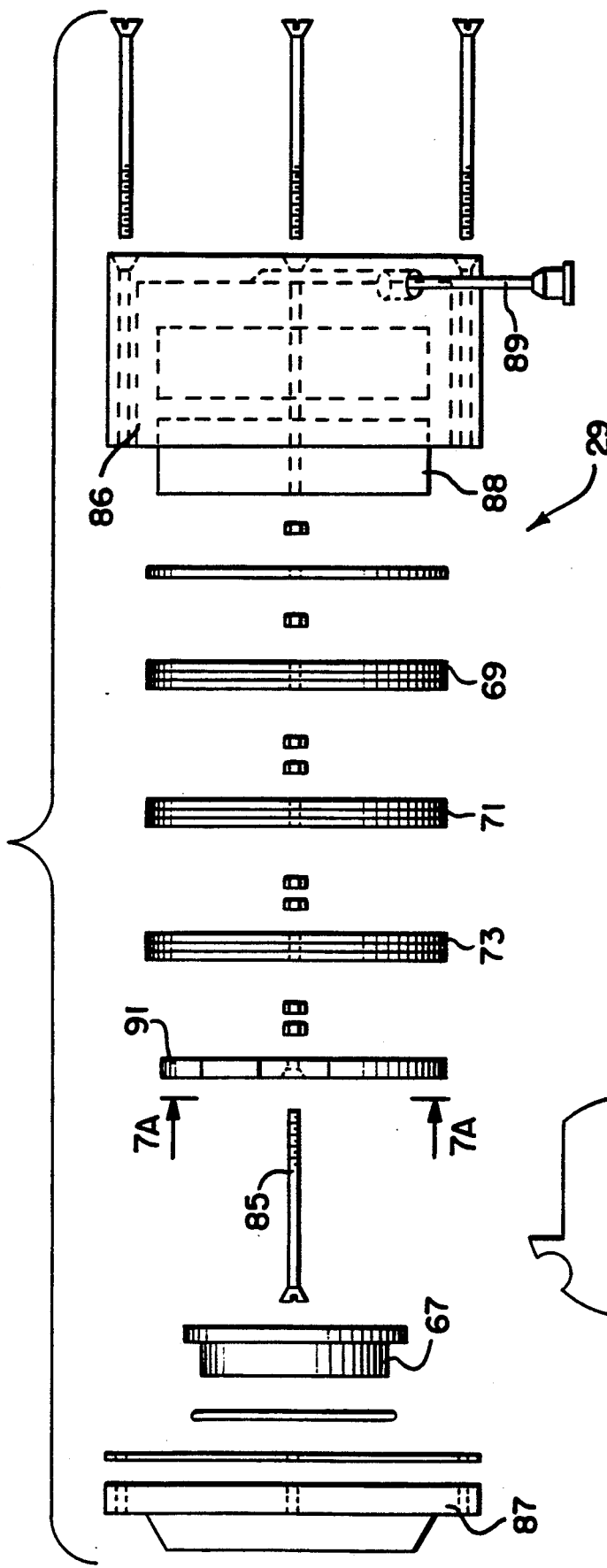

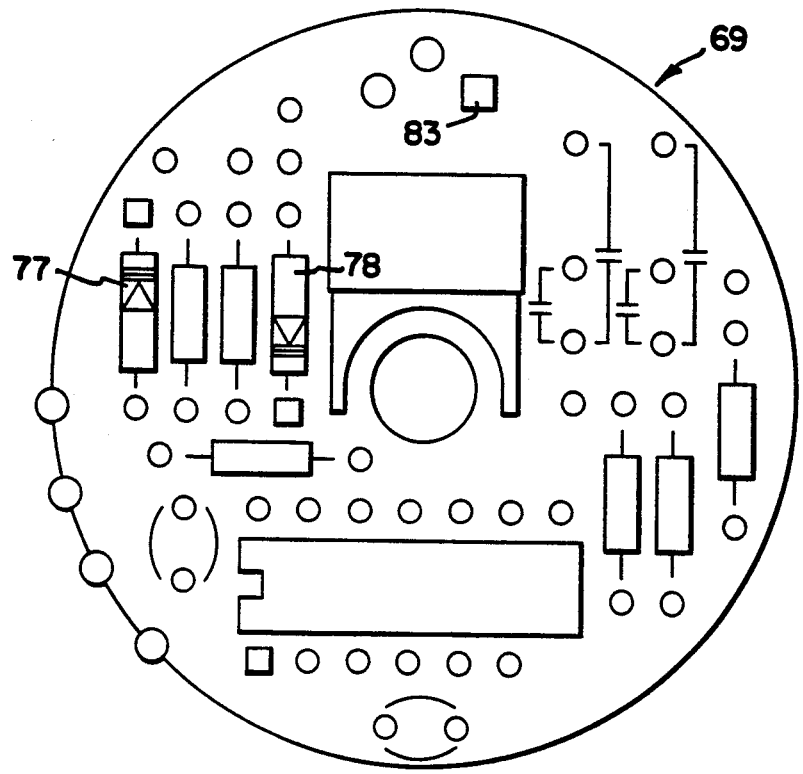
FIG_9
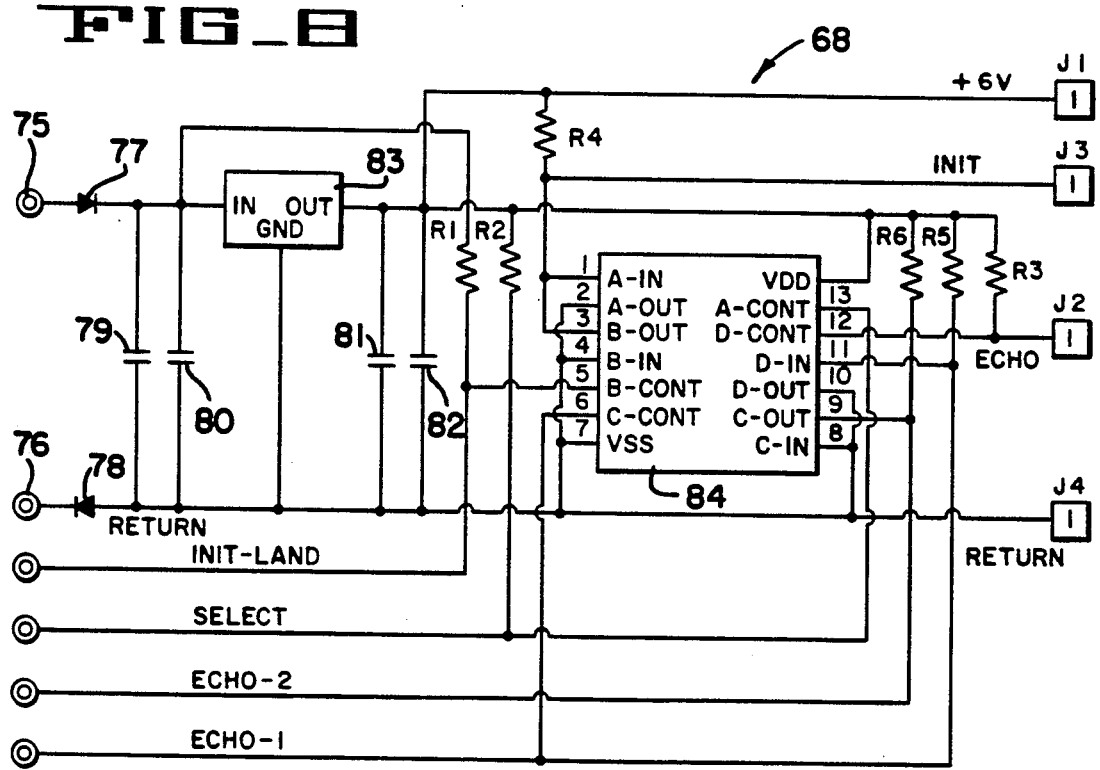
FIG_8

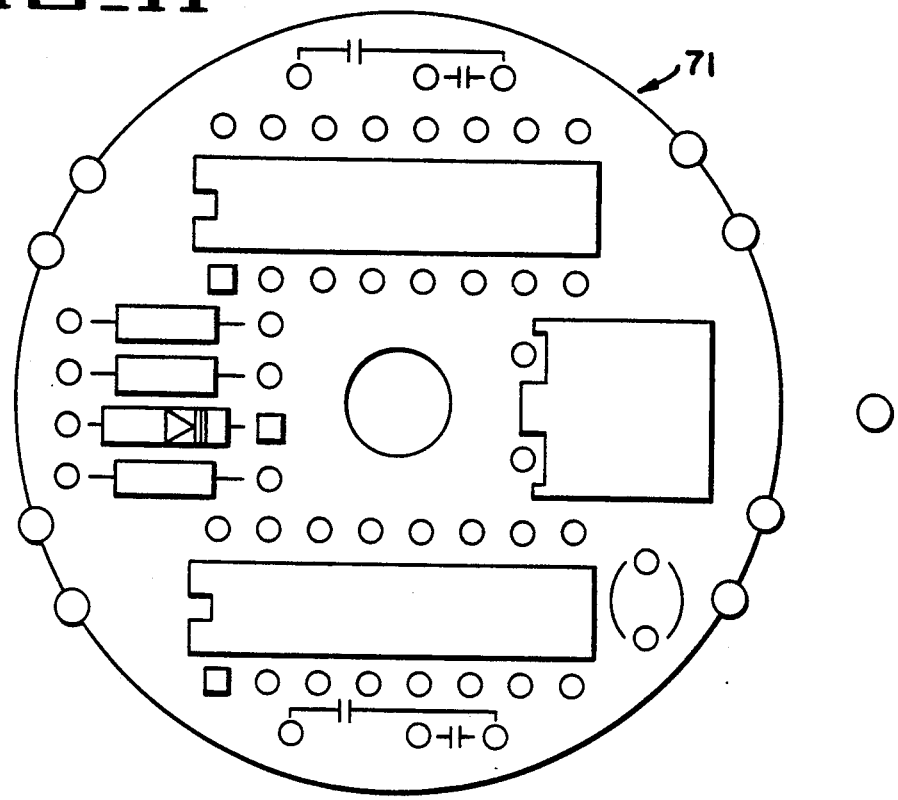
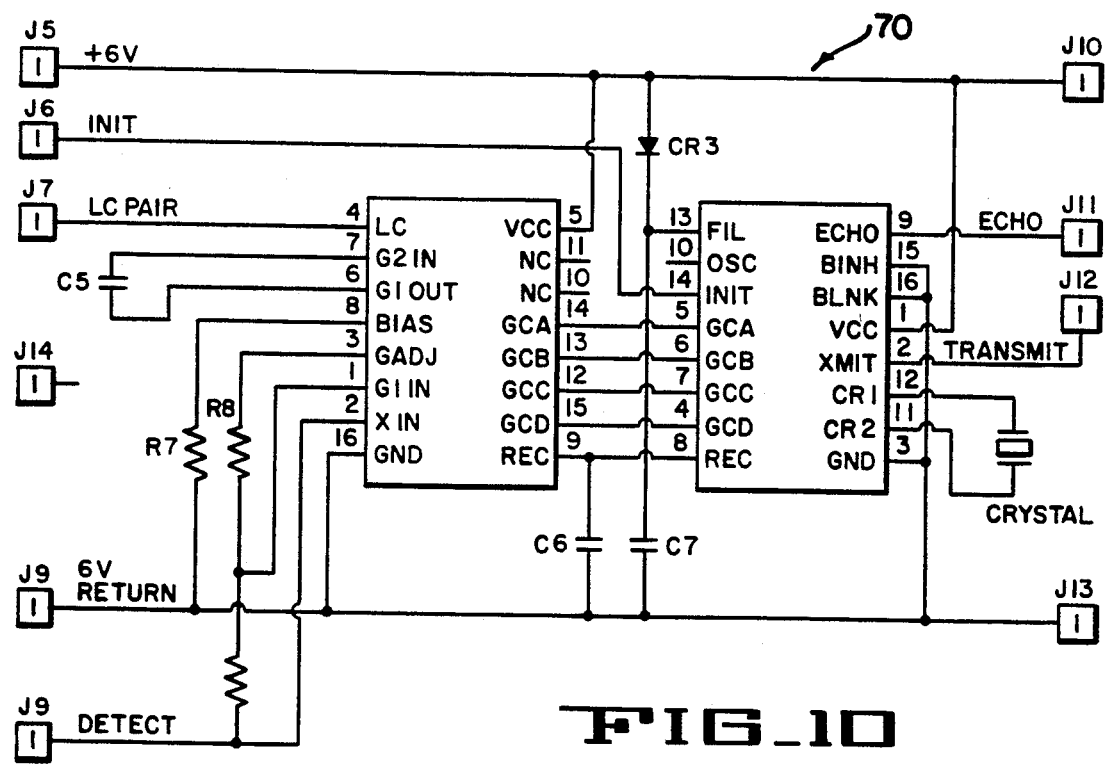

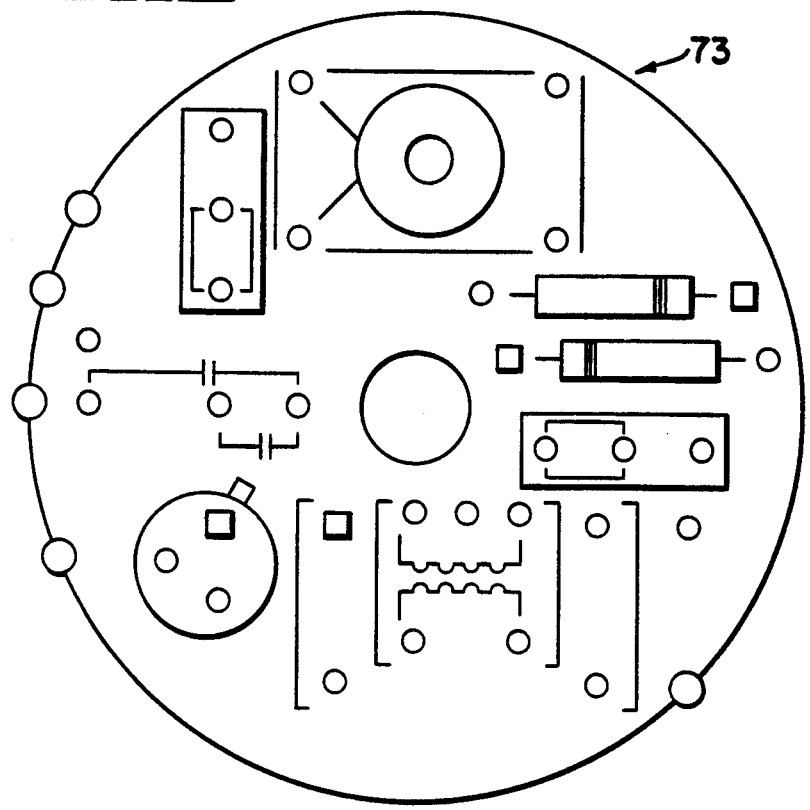
FIG_13
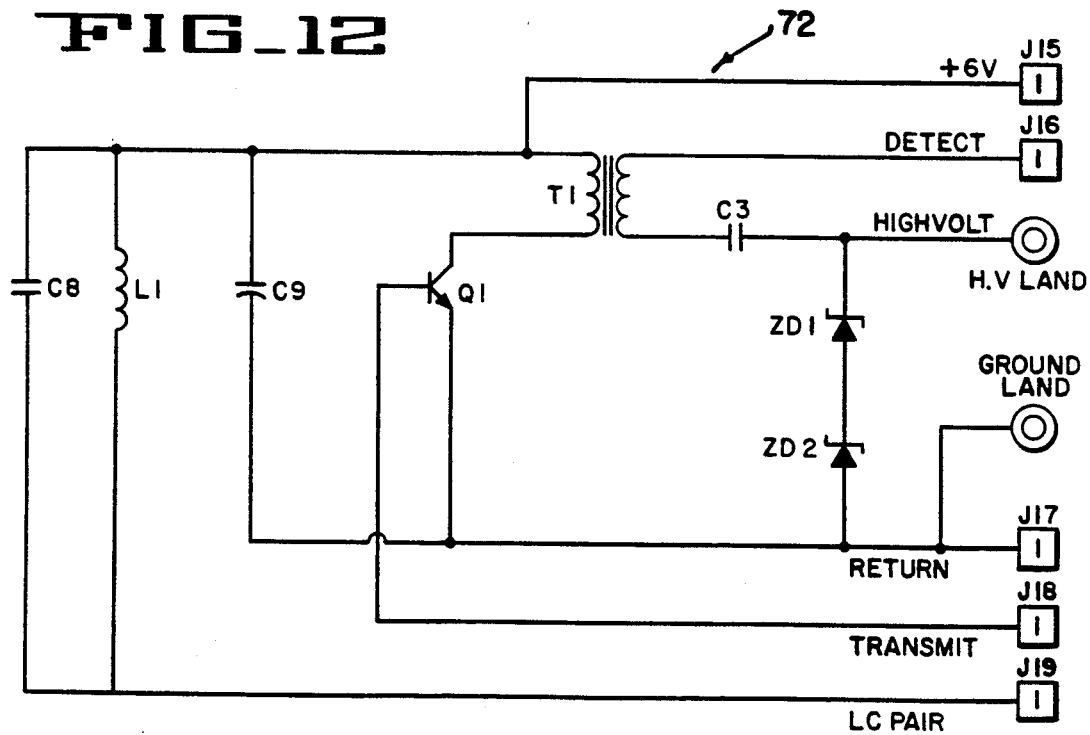
FIG_12

SENSING APPARATUS

In chemical sprayers, an apparatus is utilized to detect the presence of a plant so that chemicals are only sprayed on the plant. Some such detectors use ultrasonic transducers such as Model 604142 manufactured by the Polaroid Corporation, Cambridge, Mass. and used in Polaroid cameras. Polaroid Corporation in their manual entitled "ULTRASONIC RANGING SYSTEM, Description, operation and use information for conducting tests and experiments with Polaroid's Ultrasonic Ranging System component," states that their camera systems inhibit all other high-current electronic or electromechanical camera activity to insure a noise free environment, since such noise interferes with the detectors. The above manual further describes the use of multiple systems by attaching a single symmetrical drive to a plurality of standard ranging systems manufactured by Polaroid Corporation, wherein each ranging system is attached to a transducer. Since standard ranging systems are used, they require the inhibition of all high-current electronic or electromechanical activities. Such inhibition of electronic activity is undesirable for chemical sprayers. The invention provides an improved sensing apparatus, which allows a more precise application of chemicals to a plant.

It is an object of the invention to provide an improved sensing apparatus, which allows a more precise application of chemicals to a plant.

It is another object of the invention to provide an improved sensing apparatus, which is less susceptible to electrical noise.

The invention provides a controlling device which comprises a control box, a power box, a right sensor control unit attached to a plurality of proximity detectors, a left sensor control unit attached to a plurality of proximity detectors, and a valve box control unit, wherein each proximity detector comprises an ultrasonic transducer, a first circuit for handshaking, noise reduction and voltage regulation, and a second and third circuit for digital signal generation, analog reception and digital conversion, wherein the first circuit is connected between a left or right sensor control and second and third circuits of a proximity detector.

FIG. 1 is a side elevation illustrating an air sprayer apparatus which includes the sprayer control system of the present invention.

FIG. 2 is a front elevational view of the air spray apparatus disclosed in FIG. 1.

FIG. 3 is a rear elevational of the air sprayer apparatus disclosed in FIG. 1.

FIG. 4 is a diagrammatic illustration of a control system of the present invention used in the embodiment illustrated in FIG. 1.

FIG. 5 is a more detailed view of the control box of the control system used in the embodiment illustrated in FIG. 1.

FIG. 6 is a schematic diagram of the plumbing of the embodiment illustrated in FIG. 1.

FIG. 7 is a cross-sectional exploded view of a proximity detector used in the embodiment illustrated in FIG. 1.

FIG. 7A is a view of FIG. 7 along lines 7A—7A of the proximity detector.

FIG. 8 is a schematic diagram of a first circuit used in the proximity detector illustrated in FIG. 7.

FIG. 9 is a circuit board in the proximity detector illustrated in FIG. 7 containing the circuit illustrated in FIG. 8.

FIG. 10 is a schematic diagram of a second circuit used in the proximity detector illustrated in FIG. 7.

FIG. 11 is a circuit board in the proximity detector illustrated in FIG. 7 containing the circuit illustrated in FIG. 10.

FIG. 12 is a schematic diagram of a third circuit used in the proximity detector illustrated in FIG. 7.

FIG. 13 is a circuit board in the proximity detector illustrated in FIG. 7 containing the circuit illustrated in FIG. 12.

FIGS. 1-3 illustrate an air spryer apparatus 10 for orchards and the like, which includes a main frame 11 which is movable on a pair of wheels 12, 13. A tongue 17 is adapted for connection to a tractor or other source of propulsion through an orchard or vineyard. A holding tank 18 for carrying an agricultural spray solution is mounted over the wheels 12,13 and an engine 19 for operating a pump 22, and a blower assembly 23 is mounted on the front portion of the frame 11. The blower assembly 23 includes an air inlet opening 24 and a plurality of outlet openings 27 adjacent to a plurality of spray nozzles 28. The blower assembly 23 provides an air blast through the outlet openings 27 which cause spray solution from nozzles 28 to be blown outwardly onto plants (not shown) adjacent to the sprayer 10. A plurality of plant proximity detectors 29a-29h (FIGS. 1, 2) mounted along the front portion of the sprayer apparatus 10 each sense the presence or absence of plants in a conical area 30a-30h extending radially outward from the apparatus 10 (FIG. 2). Proximity detector 29a senses any plant present in conical area 30a; proximity detector 29b senses any plant present in conical area 30b, etc.

A control box 34 (FIG. 1) having means for mounting on a front portion 10a of the sprayer apparatus 10 is connected to the spray apparatus 10 by a flexible signal cable 35. The control box 34 in includes a plurality of buttons and panels and will be describe in more detail below. The control box 34 can be unhooked from the sprayer apparatus and moved into the cab of a tractor to provide convenient selection of spray control parameters by a human operator. A speed sensor 40 connected to one of the wheels 12, 13 provides speed signals proportional to the ground speed of the sprayer apparatus.

FIG. 4 is a diagrammatic illustration of a control system of the present invention used in the embodiment illustrated in FIG. 1. The control box 34 is connected to a four wire bus 36, part of which forms the flexible signal cable 35. Two wires of the four wire bus 36 are used for power, and two wires of the four wire bus 36 are used to carry communication signals. The four wire bus 36 is connected to a power box 38, a right sensor control unit 41, a left sensor control unit 42, a valve box control unit 43 and a pressure control unit 44. The power box 38 is electrically connected to a power source, the speed sensor 40, a remote switch 46 and an alarm system 47 wherein the power box 38 provides output to the alarm system 47, which may be an audible alarm. The right sensor control unit 41 is electronically connected to the right sensors 29e-29h. The left sensor control unit 42 is electronically connected to the left proximity detectors 29a-29d. The valve box control unit 43 is electronically connected to a plurality of valves 48a-48h. The pressure control unit 44 is electronically connected to a flow control valve 49, a flow transducer 50, and a pressure transducer 51 which is electronically connected to a sensor in the holding tank 18. In this embodiment of the invention the left sensor control unit 42, the right sensor control unit 41, and the valve box control unit 43 are identical parts, with the only difference between them is the way in which they are cabled together and their jumper settings. This allows for efficient interchangeability of parts.

FIG. 5 is a detailed view of the control box 34. The control box comprises a first pod 53 and a second pod 54. The first pod 53 comprises a first LCD screen 55, a first switch 56 and a second switch 57 and is used for land area measurement. The second pod 54 comprises a second LCD screen 58 and a third switch 59. The first LCD screen 55 displays the target ground speed, deviation from the target ground speed, elapsed time or distance travelled, whether in a hold or engaged state, calibration parameters, the total area covered, the area of the subfield covered and the time. The second LCD screen 58 displays the the number of gallons of fluid dispersed per acre, pressure, current flow rate, summated elapsed flow, tree row spacing, maximum tree distance envelope, time delay, the operation of the proximity detectors 29 and the operation of the nozzles 28.

The first pod 53, the second pod 54, the power box 38, the right sensor control unit 41, the left sensor control unit 42, the valve box control unit 43, and the pressure control unit 44 each have their own processors.

FIG. 6 is a schematic diagram of the plumbing of the embodiment illustrated in FIG. 1. The holding tank 18 holds the fluid to be sprayed. The pump 22 draws the fluid from the tank. In this embodiment, the fluid from the pump 22 is directed to a return pipe 61 to the holding tank 18 and to a flow control valve 62. The fluid directed to the flow control valve 62 passes through the flow control valve 62 and through a flow transducer 63, which measures the fluid flow rate, and to a left manifold 64 and a right manifold 65. Fluid in the left manifold 64 flows through the left valves 48a–48d to the left nozzles 28a–28d. Fluid in the right manifolds flows through the right valves 48e–48h to the right nozzles 28e–28h. Simpler embodiments of the invention would connect the pump 22 directly to the left manifold 64 and the right manifold 65 removing the return pipe 61, the flow control valve 62 and the flow transducer 63.

FIG. 7 illustrates a cross-sectional exploded view of a proximity detector 29. The proximity detector 29 utilizes an ultrasonic transducer 67 such as Model 604142 manufactured by the Polaroid Corporation, Cambridge, Mass. and used in Polaroid cameras. A first circuit 68 (FIG. 8) on a first circuit board 69 (FIG. 9), is electrically connected to a left or right sensor control unit. A second circuit 70 (FIG. 10) on a second circuit board 71 (FIG. 11) and a third circuit 72 (FIG. 12) on a third circuit board 73 (FIG. 13) are electrically connected between the first circuit 68 and the ultrasonic transducer 67. FIG. 7A is a view of FIG. 7 along lines 7A—7A, which illustrates an orientation disk 91.

The first circuit 68 comprises a positive terminal 75 and a return terminal 76, which are connected to a right or left sensor control. The first circuit is designed for an approximately 12 volt voltage drop to be applied between the positive terminal 75 and the return terminal 76. A first end of a first diode 77 with a first end and a second end is electrically connected to the positive terminal 75. A first end of a second diode 78 with a first and second end is electrically connected to the return terminal 76. A first capacitor 79 of approximately 22 mF, a second capacitor 80 of approximately 0.1 mF, a third capacitor 81 of approximately 100 mF, and a fourth capacitor 82 of approximately 0.1 mF are all electrically connected in parallel between the second end of the first diode 77 and the second end of the second diode 78. Between the second capacitor 80 and the third capacitor 81 and the positive terminal side, a 6 volt voltage regulator 83 is placed to cause the voltage drop between the output of the voltage regulator and ground to be 6 volts. A quad bilateral switch 84 which specifically may be a 4066 quad bilateral switch is electrically connected to the 6 volt voltage regulator 83 and the capacitors as illustrated in FIG. 8. This circuit regulates the voltage and eliminates noise. The first and second diodes 77, 78 reduce electrical noise from the power supply by blocking electrical noise or converting the noise to a D.C. signal. The quad bilateral switch 84 blocks electrical noise from the signal lines.

The second circuit 70 and the third circuit 72 perform digital signal generation, analog echo reception, digital echo conversion and gain adjustment as described in the above mentioned Polaroid Corporation manual.

As shown each circuit 68, 70, 72 is placed on a single substantially circular board 69, 71, 73, wherein the diameter of each board is less than two times the diameter of the transducer 67. The boards 69, 71, 73 are mounted on a central shaft formed by a bolt 85. The transducer 67 and boards 69, 71, 73 are mounted in a cylindrical backshell 86 and transducer housing 87 and packing foam 88, which shield the circuits 68, 70, 72 from acoustical noise. A connector cable 89 electrically connected to the first circuit 68 passes through the backshell 86 to be connected to a right or left control unit 41, 42.

In operation, the air sprayer 10 is attached to the back of a tractor with the control box 34 being placed in the cab of the tractor. In this embodiment of the invention, the pump 22 on the air sprayer 10 are powered by the engine 19, and the electrical system is powered by the tractor's 12 volt battery. The operator uses the control box 34 to set the target speed, the tree spacing, the maximum tree distance envelope, and the time delay. The tractor pulls the air sprayer between the rows of trees. The pump 22 causes a spray fluid pressure in the left and right manifolds 64, 65 against the closed valves 48a–48h.

The right and left sensor control units 41, 42 send signals serially to each of the sensors 29a–29h. The first circuits 68 of the sensors 29a–29h receive signals and power from the right or left sensor control units 41, 42 and regulate the power and transmit the signals to the second and third circuits 70, 72. The second and third circuits 70, 72 cause the transducers 67 to transmit an acoustical signal and receive any echoes. The second and third circuits 70, 72 upon detection of an echo and send a digitalized output to the first circuits 68, which send the signals to the right or left sensor control units 41, 42. By placing the first circuits 68 adjacent to the first and second circuits 70, 72 and by utilizing the first and second diode 77, 78 and the first, second, third and fourth capacitors 79, 80, 81, 82 the first circuits 68 are able to screen out noise, and thus keep the transducers 67 from constantly firing. In the design described in the above mentioned manual by the Polaroid Corporation, electrical activity by the air sprayer and the environment would cause sufficient noise to cause the transducers 67 to constantly fire, thus interfering with correct ranging.

After an echo signal is sent to the right or left sensor control units 41, 42 the right or left sensor control units 41, 42 determine the time interval between the sending of a signal and the received echo and convert the time interval to a distance from which a detected tree is from the sensor. The system determines whether the detected tree is within the maximum tree distance envelope. If the tree is within the maximum tree distance envelope a "plant-present" signal is sent, otherwise a "plant-absent" signal is sent to the valve box control unit 43. Using the speed of travel, the valve box stores the signal until the nozzles 28a-28h are adjacent to the sensed tree. The valve control box 43 then opens valves corresponding to the plant sensors 29a-29h which have sent a "plant-present" signal. For example when sensor 29a detects a plant, the valve box control unit 43 causes valve 48a to open so pump 22 provides fluid through the flow control valve 49, the flow transducer 50 through the left manifold 64 to the corresponding nozzles 28a. Nozzles 28a and the blower assembly 23 provide fluid to a plant in conical area 30a.

Flow transducer 50 provides information to the pressure control unit 44 concerning the rate of fluid flow to the left and right manifolds 64, 65. The pressure transducer 51 provides a signal representative of fluid pressure provided to the left and right manifolds 64, 65. As fluid flow to the left and right manifolds 64, 65 decreases pressure from the pump 22 increases, causing pressure transducer 51 to provide a signal to the pressure control unit 44, which cause the flow control valve 62 to partially close. The partially closing of the flow control valve 62 causes pressure on the output end of the pump 22 to increase, which causes fluid flow through the bypass pipe 61 to increase slightly. The bypass pipe 61 allows fluid to be pumped from the tank 18 by the pump 22 whenever the engine 19 is running.

While a preferred embodiment of the present invention has been shown and described herein, it will be appreciated that various changes and modifications may be made therein without departing from the spirit of the invention as defined by the scope of the appended claims.

What is claimed is:

1. An ultrasonic sensing apparatus connected to a power source with a positive terminal and a negative terminal and signaling source, comprising:
   a housing comprising a shell surrounding a central cavity;
   a first circuit electrically connected to the power source and the signaling source, wherein the first circuit is in the cavity, comprising:
   a positive terminal electrically connected to the positive terminal of the power source;
   a return terminal electrically connected to the negative terminal of the power source;
   means for suppressing noise from the power source, wherein the means for suppressing noise from the power source comprises:
      a first diode with a first end and a second end, wherein the first end of the first diode is electrically connected to the positive terminal, and wherein the first diode allows current to flow from the first end to the second end, but resists current from flowing from the second end to the first end; and
      a second diode with a first end and a second end, wherein the first end of the second diode is electrically connected to the return terminal, and wherein the second diode allows current to flow from the second end to the first end, but resists current from flowing from the first end to the second end; and
   means for suppressing noise from the signaling source;
   a second circuit electrically connected to the first circuit wherein the second circuit is in the cavity, comprising;
   means for generating a digital signal from a signal from the signaling source and electrically connected to the first circuit;
   means for receiving an analog echo signal electrically connected to the first circuit; and
   means for amplifying the analog echo signal electrically connected to the first circuit; and
   an ultrasonic transducer electrically connected to the second circuit, wherein the ultrasonic transducer is able to transform the digital signal to an ultrasonic acoustical wave and transform an ultrasonic acoustical wave to the analog echo signal.

2. An ultrasonic sensing apparatus, as claimed in claim 1, wherein the means for suppressing noise from the signalling source comprises a quad bilateral switch electrically connected to the signal source.

3. An ultrasonic sensing apparatus, as claimed in claim 2, wherein the first circuit further comprising, a plurality of capacitors electrically connected in parallel between the second end of the first diode and the second end of the second diode.

4. An apparatus, as claimed in claim 3, wherein the housing provides acoustical shielding.

5. An apparatus for controlling a plant spraying device, wherein the plant spraying device has spray nozzles on the left side and right side of the plant spraying device wherein each nozzle has a nozzle valve for controlling the spray passing the each nozzle, comprising:
   a plurality of power lines and a plurality of signal lines;
   a control box electronically connected to the plurality of power lines and the plurality of signal lines;
   a right sensor control unit electronically connected to the plurality of power lines and the plurality of signal lines, wherein the right sensor unit, comprises:
   a power source with a positive terminal and a negative terminal; and
   a signaling source;
   a left sensor control unit electronically connected to the plurality of power lines and the plurality of signal lines, wherein the left sensor unit, comprises:
   a power source with a positive terminal and a negative terminal; and
   a signaling source;
   a valve box electronically connected to the plurality of power lines and the plurality of signal lines;
   a plurality of right sensors electronically connected to the power source and the signaling source of the right sensor control unit, wherein the plurality of right sensors each comprises:
   a housing comprising a shell surrounding a central cavity;
   a first circuit electrically connected to the power source and the signaling source of the right sensor control unit, wherein the first circuit is in the cavity, comprising:
   a positive terminal electrically connected to the positive terminal of the power source of the right sensor control unit;

a return terminal electrically connected to the negative terminal of the power source of the right sensor control unit;

means for suppressing noise from the power source of the right sensor control unit, wherein the means for suppressing noise from the power source comprises:
 a first diode with a first end and a second end, wherein the first end of the first diode is electrically connected to the positive terminal, and wherein the first diode allows current to flow from the first end to the second end, but resists current from flowing from the second end to the first end; and
 a second diode with a first end and a second end, wherein the first end of the second diode is electrically connected to the return terminal, and wherein the second diode allows current to flow from the second end to the first end, but resists current from flowing from the first end to the second end; and means for suppressing noise from the signaling source of the right sensor control unit;

a second circuit electrically connected to the first circuit wherein the second circuit is in the cavity, comprising:

means for generating a digital signal from a signal from the signaling source and electrically connected to the first circuit;

means for receiving an analog echo signal electrically connected to the first circuit; and means for amplifying the analog echo signal electrically connected to the first circuit; and an ultrasonic transducer electrically connected to the second circuit, wherein the ultrasonic transducer is able to transform the digital signal to an ultrasonic acoustical wave and transform an ultrasonic acoustical wave to the analog echo signal;

a plurality of left sensors electronically connected to the power source and the signaling source of the left sensor control unit, wherein the plurality of left sensors each comprises:
 a housing comprising a shell surrounding a central cavity;
 a first circuit electrically connected to the power source and the signaling source of the left sensor control unit, wherein the first circuit is in the cavity, comprising:
 a positive terminal electrically connected to the positive terminal of the power source of the left sensor control unit;
 a return terminal electrically connected to the negative terminal of the power source of the left sensor control unit;

means for suppressing noise from the power source of the left sensor control unit, wherein the means for suppressing noise from the power source comprises:
 a first diode with a first end and a second end, wherein the first end of the first diode is electrically connected to the positive terminal, and wherein the first diode allows current to flow from the first end to the second end, but resists current from flowing from the second end to the first end; and
 a second diode with a first end and a second end, wherein the first end of the second diode is electrically connected to the return terminal, and wherein the second diode allows current to flow from the second end to the first end, but resists current from flowing from the first end to the second end; and means for suppressing noise from the signaling source of the left sensor control unit;

a second circuit electrically connected to the first circuit wherein the second circuit is in the cavity, comprising:

means for generating a digital signal from a signal from the signaling source and electrically connected to the first circuit;

means for receiving an analog echo signal electrically connected to the first circuit; and means for amplifying the analog echo signal electrically connected to the first circuit; and an ultrasonic transducer electrically connected to the second circuit, wherein the ultrasonic transducer is able to transform an electrical wave signal to an ultrasonic acoustical wave and transform an ultrasonic acoustical wave to the analog echo signal;

a plurality of valves electrically connected to the valve box, wherein each valve controls flow of spray to a nozzle.

6. An apparatus, as claimed in claim 5, wherein the control box comprises:
 means for displaying the target ground speed, deviation from the target ground speed, area covered, number of gallons of spray dispersed per acre, plant row spacing, and time delay.

7. An apparatus, as claimed in claim 6, wherein the left sensor control unit, the right sensor control unit, and the valve box each comprise identical circuits so that the left sensor control unit, the right sensor control unit, and the valve box are interchangeable.

8. An apparatus, as claimed in claim 5, wherein the means for suppressing noise from the signaling source comprises a quad bilateral switch electrically connected to the signal source.

9. An apparatus, as claimed in claim 8, wherein the first circuit further comprising, a plurality of capacitors electrically connected in parallel between the second end of the first diode and the second end of the second diode.

10. An apparatus, as claimed in claim 9, further comprising, means for maintaining a substantially constant pressure at the plurality of valve nozzles.

11. An apparatus, as claimed in claim 9, wherein the control box comprises:
 means for displaying the target ground speed, deviation from the target ground speed, area covered, number of gallons of spray dispersed per acre, plant row spacing, and time delay.

12. An apparatus, as claimed in claim 11, wherein the left sensor control unit, the right sensor control unit, and the valve box each comprise identical circuits so that the left sensor control unit, the right sensor control unit, and the valve box are interchangeable.

13. An apparatus, as claimed in claim 12, further comprising, means for maintaining a substantially constant pressure at the plurality of valve nozzles.

14. A method of spraying plants with an air sprayer, comprising the steps of:
 entering into a control box the target speed;
 entering into the control box an estimated tree spacing;
 entering into the control box a desired time delay;
 entering the maximum desired distance;

moving the air sprayer along rows of plants wherein a first row of plants may be on the right side of the air sprayer and a second row of plants may be on the left side of the air sprayer;

powering a plurality of right sensors from a right sensor control unit;

powering a plurality of left sensors from a left sensor control unit;

sending signals serially from the right sensor control unit to the plurality of right sensors, wherein when a right sensor receives a signal the right sensor will cause an ultrasonic transducer to emit an ultrasonic signal and then if an echo is received by the ultrasonic transducer, the right sensor generates an echo signal;

sending echo signals from the plurality of right sensors to the right sensor control unit;

sending signals serially from the left sensor control unit to the plurality of left sensors, wherein when a left sensor receives a signal the left sensor will cause an ultrasonic transducer to emit an ultrasonic signal and then if an echo is received by the ultrasonic transducer, the left sensor generates an echo signal;

sending echo signals from the plurality of left sensors to the left sensor control unit;

suppressing power noise between the plurality of right sensors and the right sensor control unit;

suppressing power noise between the plurality of left sensors and the left sensor control unit;

suppressing signal noise between the plurality of right sensors and the right sensor control unit;

suppressing signal noise between the plurality of left sensors and the left sensor control unit;

determining the time intervals between when a signal is sent to each right sensor and when an echo signal is received from the right sensor;

determining the time intervals between when a signal is sent to each left sensor and when an echo signal is received from the left sensor;

converting the time intervals into measured distances;

determining whether the measured distances are less than the maximum desired distance;

waiting for set time delay;

opening valves corresponding to sensors that correspond to time intervals that yield measured distances that are less than the maximum desired distance.

15. A method, as claimed in claim 14, wherein;

the step of suppressing power noise between the plurality of right sensors and the right sensor control unit comprises the step of placing in each of the plurality of right sensors a first diode and a second diode through which all power current in a right sensor passes;

the step of suppressing power noise between the plurality of left sensors and the left sensor control unit comprises the step of placing in each of the plurality of left sensors a first diode and a second diode through which all power current in a left sensor passes;

the step of suppressing signal noise between the plurality of right sensors and the right sensor control unit, comprises the step of placing in each of the plurality of right sensors a quad bilateral switch through which all of the signal current passes; and the step of suppressing signal noise between the plurality of left sensors and the right sensor control unit, comprises the step of placing in each of the plurality of left sensors a quad bilateral switch through which signal current passes.

16. A method of sensing, comprising the steps of:

powering a sensor from a sensor control unit;

sending signals to the sensor through a positive terminal and a return terminal of the sensor;

suppressing power noise between the sensor and the sensor control unit comprising the step of placing in the sensor a first diode and a second diode through which all power current in the sensor passes so that the current passes from the positive terminal to the first diode, through the remaining sensor, and then to the second diode and then through the return terminal; and suppressing signal noise between the sensor and the sensor control unit comprising the step of placing in the sensor a quad bilateral switch through which signal current passes;

generating a digital signal from the signals sent to the sensor;

converting the digital signal to an ultrasonic signal;

receiving an analog echo of the ultrasonic signal;

converting the analog echo to an electric echo signal;

amplifying the electric echo signal; and sending the electric echo signal from the sensor to the sensor control unit.

* * * * *